United States Patent Office 2,957,913
Patented Oct. 25, 1960

2,957,913
PROCESS FOR PREPARING UREAS

John A. Patterson, Fishkill, N.Y., assignor to Texaco Inc., a corporation of Delaware No Drawing. Filed Dec. 26, 1958, Ser. No. 783,001

3 Claims. (Cl. 260—555)

This invention relates to a process for preparing ureas from carbon monoxide and ammonia or a substituted ammonia using moderate conditions in a reaction zone fed with sulphureous substance. Urea is useful as a fertilizer and as a reactant for making plastics and resins. Substituted ureas are useful for making weed killers and moth-proofing agents.

Heretofore it has been proposed to react carbon monoxide with ammonia or a substituted ammonia in the presence of elemental sulfur in a reaction zone to make ureas. In order to induce solution of the sulfur in the reaction mixture it is conventional to use some hydrogen sulfide also. Another conventional process calls for the use of carbonyl sulfide instead of elemental sulfur. Still other conventional processes react ammonia with carbon dioxide to make urea.

My process has the advantage of employing easily handled, fluid charge stocks. This simplifies reactor feeding problems. The process also uses milder conditions than the conventional syntheses of urea from ammonia and carbon dioxide, and it does not require the expense of producing an intermediate such as carbonyl sulfide.

Broadly my improvement in a process of the type described comprises supplying the reaction zone with hydrogen sulfide and sulfur dioxide as the sole sulphureous substance, and conducting the reaction in the presence of an inert liquid vehicle.

Reaction time can be from about a minute to as long as 10 hours or even more, and preferably it is from about 10 minutes to about 4 hours for making urea itself, and about 3-8 hours for making the substituted ureas. In continuous systems the reaction time is calculated as an average reaction time, and it is based then on the volumetric feed rate of the materials other than the ones fed in gaseous state to the reactor and the empty reactor space.

The process is practiced in the presence of a substantially inert liquid vehicle such as methanol, ethanol, isopropanol or other lower ($C_1$–$C_8$) alkanol, petroleum ether, benzene, isopropyl ether, trichloroethylene, aqueous $C_1$–$C_3$ alkanols, ethylene glcol, 2-methoxyethanol-1, tetrahydrofurfural alcohol, and formamide. The inert vehicle broadly composes about 40 to about 95 weight percent of the reaction mixture as charged, and preferably it is from 70 to 90 weight percent of such mixture. The pressure in the operation should be at least sufficient to suppress substantial volatilization of the liquid vehicle employed. Suitably, the pressure in my process is from 200–2000 p.s.i.g. and preferably it will be between 300 and 1000 p.s.i.g. It is especially advantageous that the reaction vehicle be a solvent at reaction conditions employed for the urea being made, thereby eliminating some solids handling problems in the reactor.

When ammonia is used the product is urea (carbamide). Substituted ammonias yield correspondingly substituted ureas. Suitable amines for the process are hydrocarbyl primary monoamines such as isobutylamine, n-decylamine, and ethylamine. Generally the alkyl primary amines having up to 10 carbon atoms are the most suitable substituted ammonias to use, but use of hydrocarbonyl primary monoamines having ethylenic unsaturation, or even amine alcohols such as monoethanolamine, also are reactants conceivable for my process.

Broadly the temperature for the operation should be between about 150° and about 300° F. When ammonia is the reactant I prefer to use a temperature between about 180° and 250° F. Generally the use of substituted ammonia reactants calls for use of a higher temperature than does the reaction when ammonia itself is employed.

While the carbon monoxide reactant can be concentrated, e.g. 90 volume percent or higher, carbon monoxide gas streams that are comparatively dilute can also be used because my process is substantially insensitive to ill effects from such dilution; (this is not the case when elemental sulfur and solubilizing $H_2S$ are used). Thus, in my process the CO stream can contain 0.2–4 volume parts of carbon monoxide per volume part of hydrogen, nitrogen or other diluent. A suitable CO gas can be generated by the combustion of metallurgical coke with air, or by the partial oxidation of carbon containing substance with oxygen or air to make substantial quantities of hydrogen in connection with the production of CO, a conventional synthesis gas. The carbon monoxide feed also can contain substantial amounts of carbon dioxide, e.g. upwards to 25% or even more as well as carbonyl sulfide, hydrogen sulfide and associated sulphureous impurities which are frequently present in carbon monoxide-bearing streams; these impurities need not be cleansed from the gas. The comparative insensitivity of my process to diluents in the CO makes it especially economical.

The mol ratio of ammonia or substituted ammonia: carbon monoxide used in my process can be between about 10:1 and about 0.1:1 or even lower, and preferably it will be between about 0.1:1 and about 0.5:1 for efficiency and economy in the practice of the process. The mol ratio of ammonia or substituted ammonia:hydrogen sulfide can be between about 0.2:1 and about 20:1 or even higher, and preferably it will be between about 0.2:1 and 1:1 for efficiency and economy.

The molar proportion of hydrogen sulfide to sulfur dioxide will be generally heavy on the side of the hydrogen sulfide, e.g. 1.1–1.5 mols of hydrogen sulfide per mol of sulfur dioxide, but this ratio is susceptible to wide variations, e.g. 0.5 mol of hydrogen sulfide per mol of sulfur dioxide on up to as much as 5 mols of hydrogen sulfide per mol of sulfur dioxide. Preferably the CO and total sulphureous substance are used in molar excess over the ammonia for urea (carbamide) formation because the vent gas then can be burned as fuel, flared, or scrubbed with water, at least in part, without loss of excessive amounts of ammonia. Suitable materials of construction for use in my process include corrosion resisting ones such as an austenitic stainless steel.

The following examples show how my process has been practiced, but should not be construed as limiting the invention. All percentages given are weight percentages unless otherwise expressly stated. The reactor used in all runs was a stirred batch pressure vessel made of austenitic stainless steel. It has 1535 cc. capacity.

Example 1.—The charge to the reactor was as follows: 60 grams of ammonia, 44 grams of sulfur dioxide, 30 grams of hydrogen sulfide, 600 cc. of methanol, and carbon monoxide gas sufficient to maintain about 250 p.s.i.g. pressure. The reactor was kept at 200° F. for 3 hours, then cooled and vented to asmosphere. A small sample of the product mixture was taken for ammonia analysis, and the remainder was filtered. The filtrate was then evaporated, the temperature not being allowed to exceed 185–194° F. The residue contained 66.3 grams of urea, this being equivalent to a weight yield of 110% based on ammonia charged.

When a similar run was made under practically the same conditions except that 100 grams of 5/32" diameter by about 5/32" high cylindrical dehydrogenation catalyst pellets (molybdenum sulfide on alumina having 12.45% molybdenum, 8.35% sulfur, and specific surface of 140 square meters per gram) were included. The weight yield of urea was only 77% based on the weight of ammonia charged.

When the foregoing exemplary operation is carried out under about the same general conditions, except that a producer or a synthesis gas, e.g. 25–60 mol percent carbon monoxide and the balance hydrogen or nitrogen, is used at a pressure sufficiently high to make the partial pressure of CO broadly comparable to that when a virtually pure CO is used, e.g. 750–1000 p.s.i.g., the weight yield of urea will fall off somewhat, but the process can be said to have less sensitivity to such CO dilution than when elemental sulfur is used.

This should be contrasted with a pair of runs using a charge of 60 grams of ammonia, 44 grams of elemental sulfur, 6 grams of hydrogen sulfide (to assist in dissolving the sulfur) and 600 cc. of methanol. In these runs one was operated at 195° F. and 250 p.s.i.g. for 3 hours using pure CO, and the other was operated for 4 hours at 201° F. and 750 p.s.i.g. using a synthesis of 37.8 mol percent CO and 62.2 mol percent hydrogen, the higher pressure being used to render the CO partial pressures comparable. The weight yield of urea obtained based on ammonia charged was 117.2% in the run with the pure CO, and only 53.9% when the dilute CO was used.

I claim:
1. In a process for preparing ureas from carbon monoxide and a compound selected from the group consisting of ammonia and alkyl primary monoamines having up to 10 carbon atoms at a temperature between about 150° F. and 300° F., at a pressure from 200–2000 p.s.i.g., and at a mol ratio of compound:carbon monoxide between about 10:1 and 0.1:1 the improvement which comprises supplying the reaction zone with both the sulphureous substances hydrogen sulfide and sulfur dioxide, at a mol ratio of compound:hydrogen sulfide of between about 0.2:1 and 20:1, at a mol ratio of hydrogen sulfide:sulfur dioxide of 0.5:1 to 5:1 and conducting the reaction in presence of inert liquid vehicle for the reaction, said vehicle comprising between about 40 and 95 wt. percent of the reaction mixture.

2. The process of claim 1 wherein the carbon monoxide is dilute.

3. The process of claim 1 wherein ammonia is used, and the product is urea.

References Cited in the file of this patent
UNITED STATES PATENTS

| | | |
|---|---|---|
| 2,681,930 | Franz | June 22, 1954 |
| 2,857,430 | Applegath et al. | Oct. 21, 1958 |
| 2,857,431 | Glass et al. | Oct. 21, 1958 |

OTHER REFERENCES

Klemenc: Zeit. Anorg. Allgem. Chem., vol. 191, pp. 246–282 (1930).